United States Patent [19]

Scaramucci

[11] Patent Number: 5,156,183

[45] Date of Patent: Oct. 20, 1992

[54] TOP-ENTRY CHECK VALVE HAVING SPRING RETAINER

[76] Inventor: John P. Scaramucci, 10724 Woodridden, Oklahoma City, Okla. 73170

[21] Appl. No.: 762,517

[22] Filed: Sep. 18, 1991

[51] Int. Cl.[5] ............................................ F16K 15/03
[52] U.S. Cl. ................... 137/454.2; 137/454.6; 137/527.2; 137/527.4; 137/527.8
[58] Field of Search ............ 137/315, 327, 328, 454.2, 137/454.4, 454.5, 454.6, 527, 527.2, 527.4, 527.6, 527.8

[56] References Cited

U.S. PATENT DOCUMENTS

| | | | |
|---|---|---|---|
| 485,745 | 11/1892 | Loveland . | |
| 556,636 | 3/1896 | Kuichling . | |
| 846,317 | 3/1907 | Kiddle | 137/527.4 |
| 1,399,684 | 12/1921 | Belcher | 137/527 |
| 1,647,036 | 10/1927 | Dileo . | |
| 1,827,913 | 10/1931 | Rymal . | |
| 2,048,088 | 7/1936 | Wagner | 251/126 |
| 2,282,532 | 5/1942 | Shenk | 251/123 |
| 2,844,164 | 7/1958 | Robbins | 137/454.4 |
| 2,918,934 | 12/1959 | Wheatley | 137/527.2 |
| 2,923,317 | 2/1960 | McInerney | 137/527.2 |
| 2,928,416 | 3/1960 | Balhouse | 137/527.8 |
| 3,075,547 | 1/1963 | Scaramucci | 137/516.2 |
| 3,119,594 | 1/1964 | Heggem | 251/228 |
| 3,295,550 | 1/1967 | Scaramucci | 137/527.4 |
| 3,394,731 | 7/1968 | Elliott | 137/527.8 |
| 3,817,277 | 6/1974 | Wheatley | 137/515.7 |
| 3,934,608 | 1/1976 | Guyton | 137/527.8 |
| 4,176,681 | 9/1977 | Mackal | 137/541 |
| 4,223,697 | 9/1980 | Pendleton | 137/527.8 |
| 4,230,150 | 10/1980 | Scaramucci | 137/527 |
| 4,252,144 | 2/1981 | Scaramucci | 137/454.6 |
| 4,257,444 | 3/1981 | Ogle | 137/315 |
| 4,284,097 | 8/1981 | Becker | 137/454.2 X |
| 4,508,139 | 4/1985 | Teumer | 137/315 |

FOREIGN PATENT DOCUMENTS 1806409  9/1969 Fed. Rep. of Germany .
44-12462  6/1969 Japan .

Primary Examiner—Robert G. Nilson
Attorney, Agent, or Firm—Dunlap Codding & Lee

[57] ABSTRACT

A top-entry check valve has a valve chamber containing a seat, cage, disc and utilizes a spring retainer to prevent movement of the seat, cage and disc in the downstream direction. A removable bonnet covers an access opening the valve chamber. The seat and cage are a unitary structure for ease in replacing the seat and cage. An annular shoulder in the valve body prevents movement of the seat, cage and disc in the upstream direction. The spring retainer is secured in the valve body by engagement with a lug in the valve body, the unitary seat and cage, the access opening in the valve body and the bonnet. Removal of the bonnet allows access to the valve chamber for replacement of the seat, cage, disc or spring retainer.

13 Claims, 9 Drawing Sheets

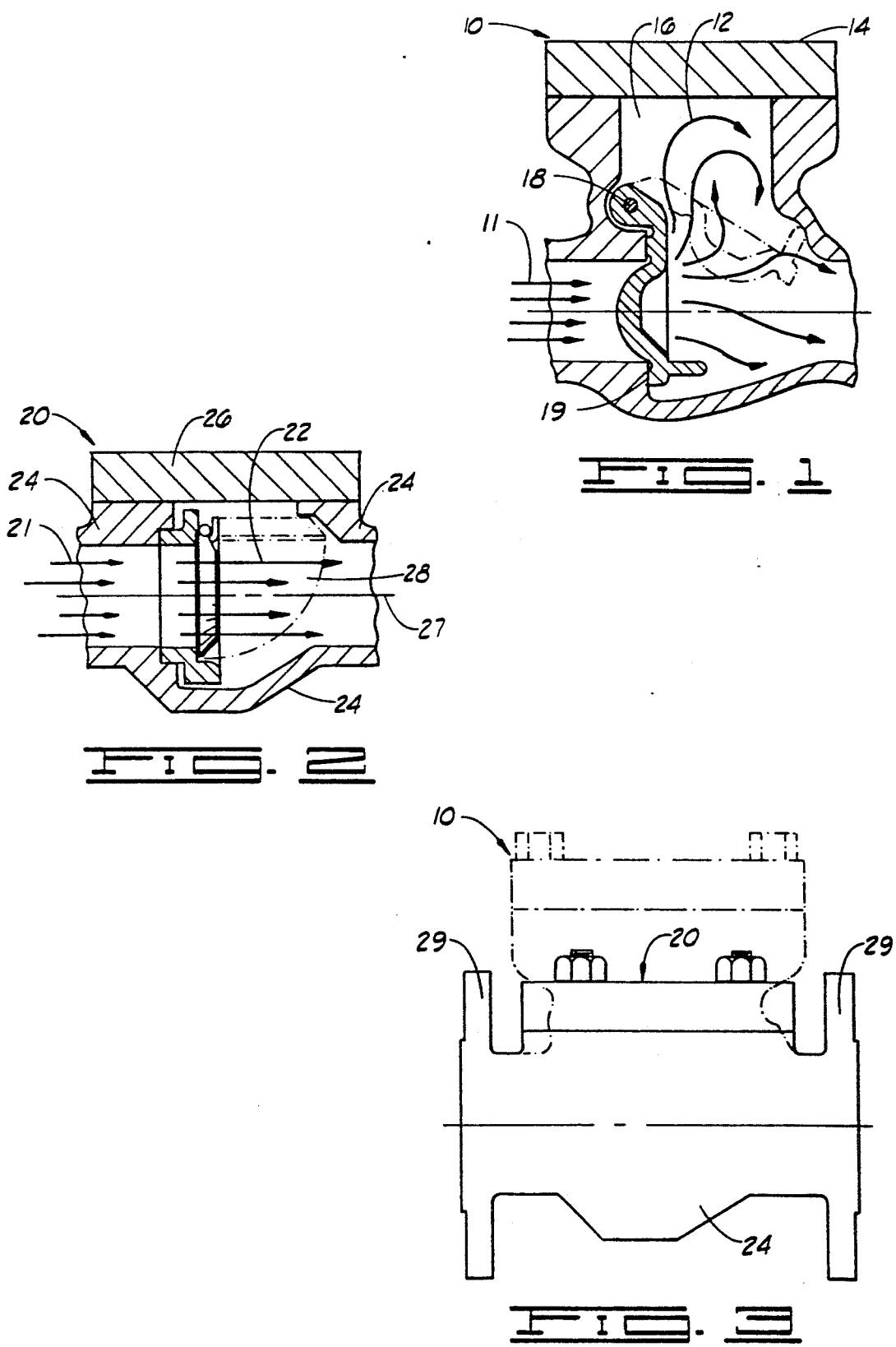

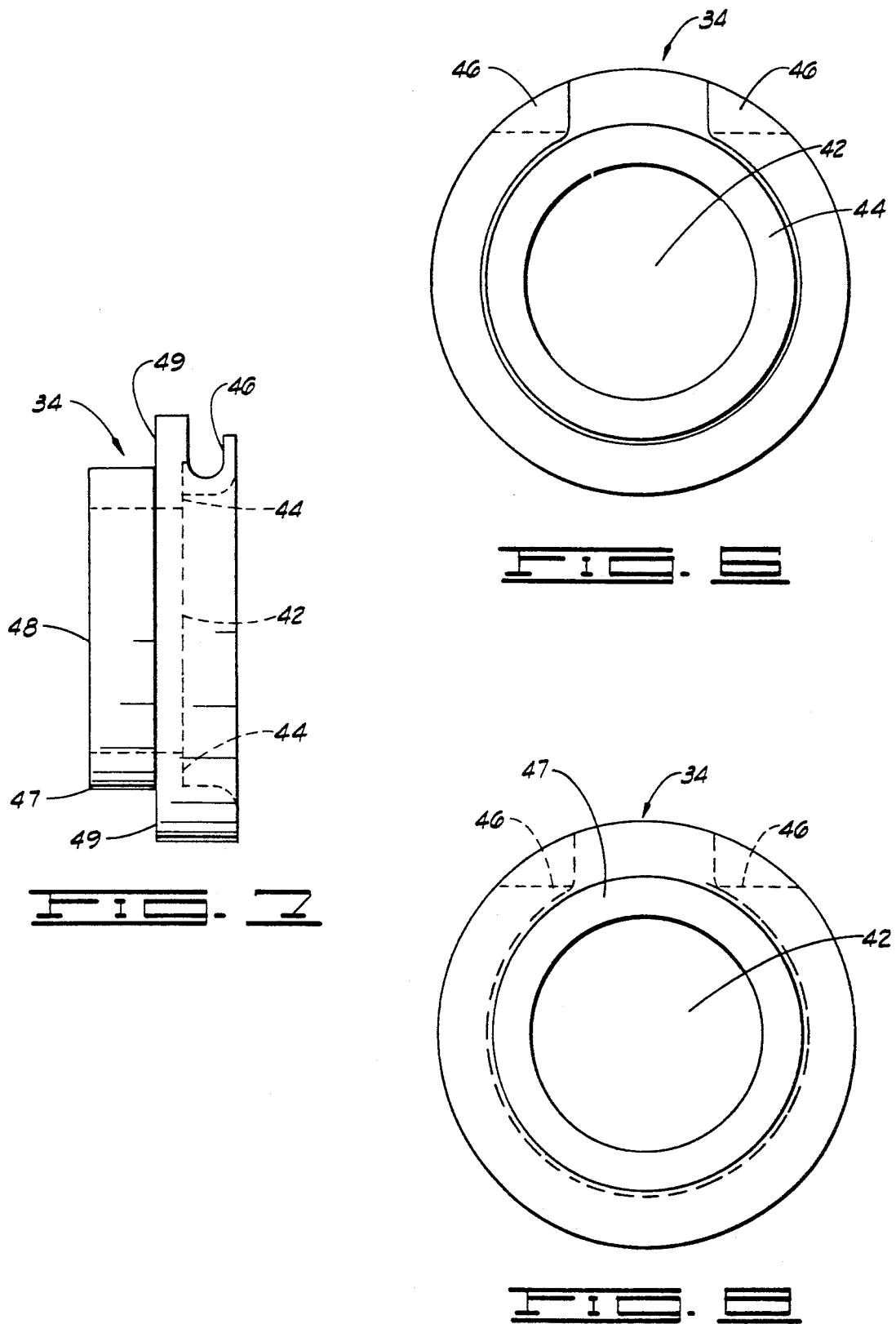

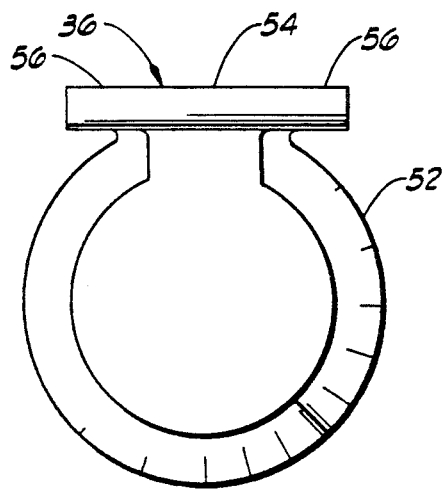
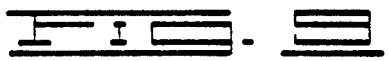
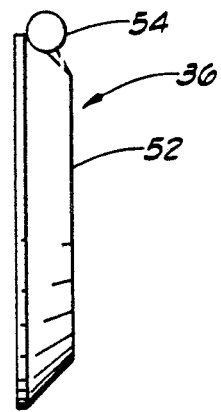
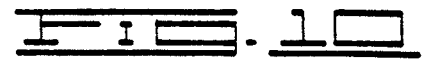
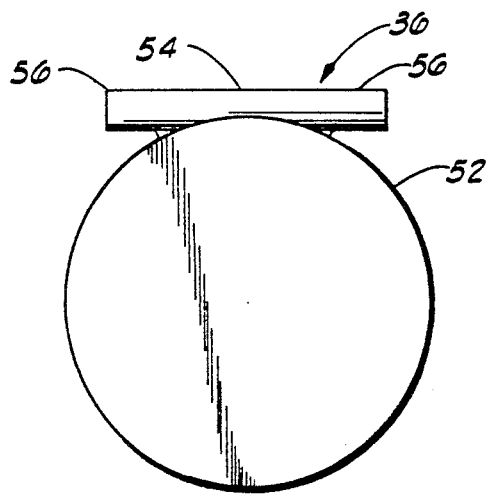

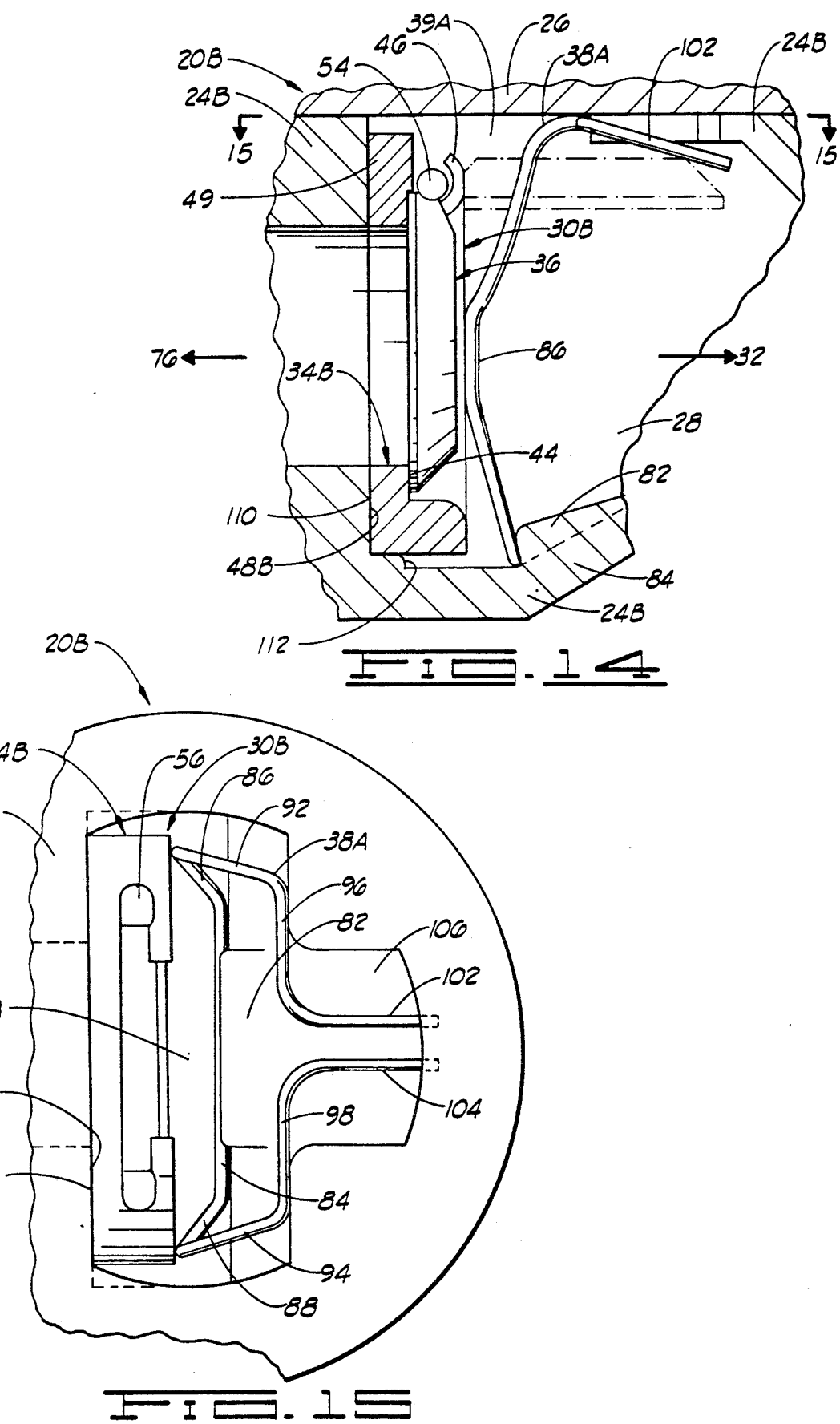

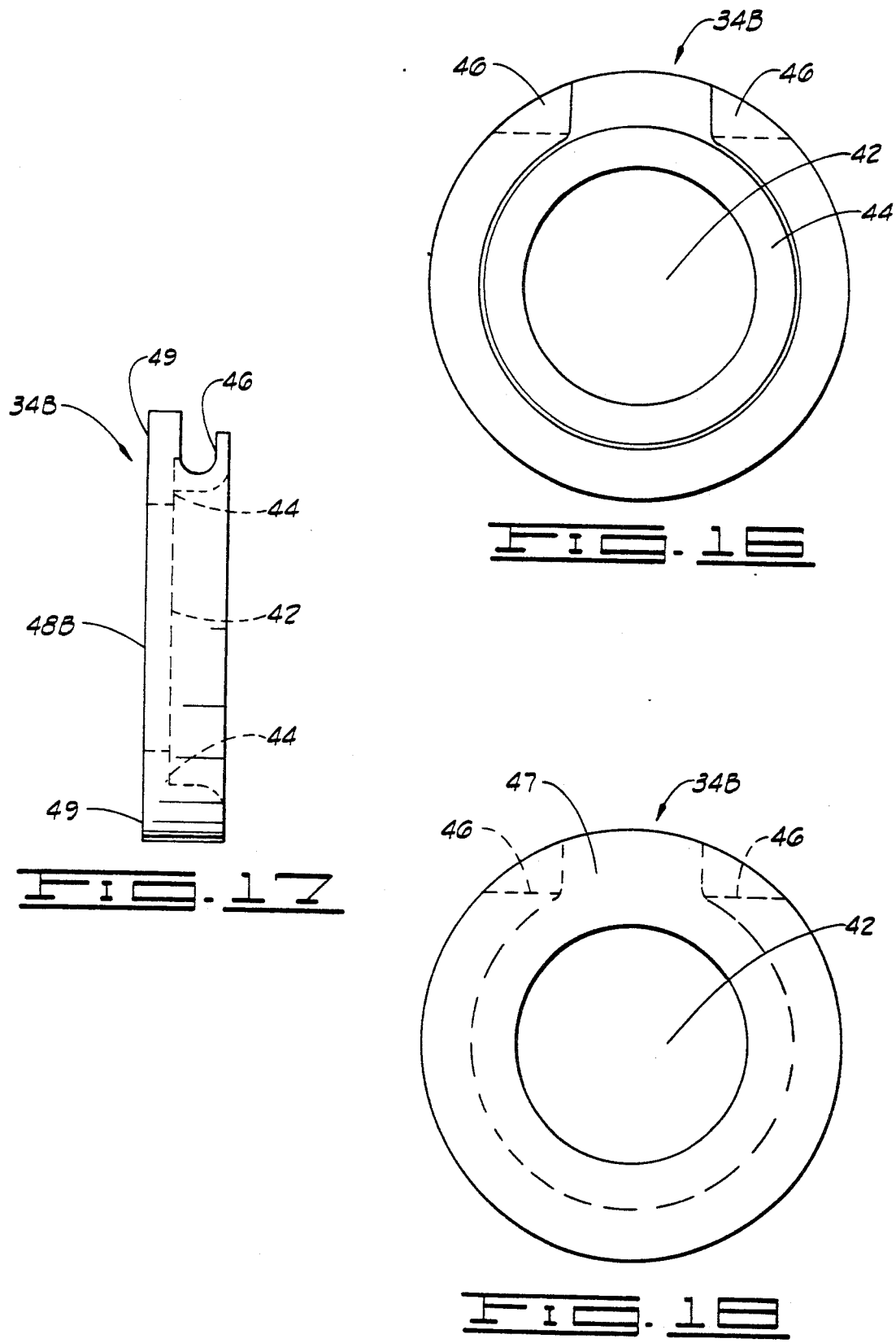

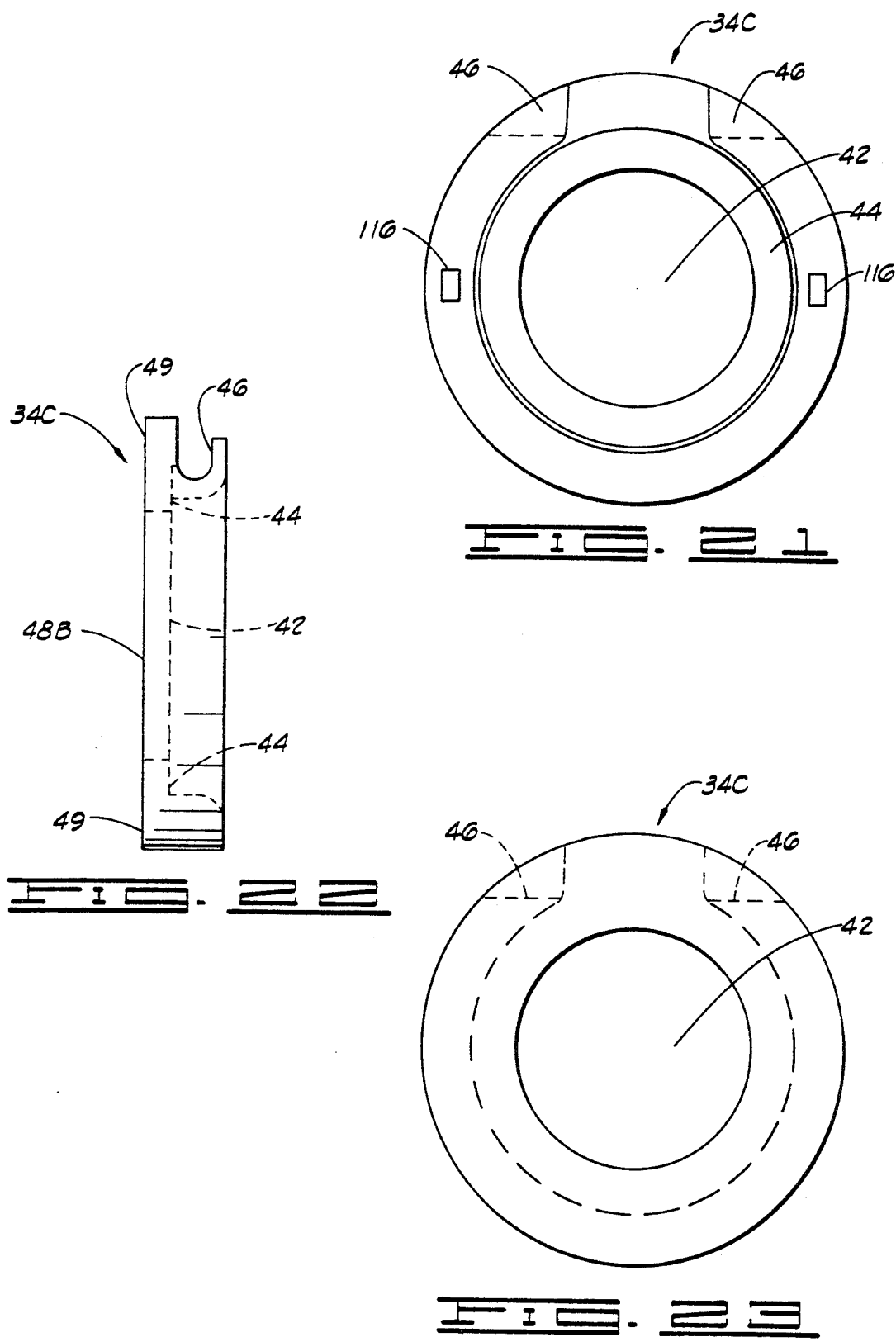

TOP-ENTRY CHECK VALVE HAVING SPRING RETAINER

CROSS-REFERENCE TO RELATED APPLICATIONS

This application is related to the following applications filed on an even date herewith:

Top-Entry Check Valve Having Retainer Ring, Ser. No. 762,104.

Top-Entry Check Valve With Threaded Fasteners, Ser. No. 762,540.

Top-Entry Check Valve With Screw-In Seat, Ser. No. 762,514.

Top-Entry Check Valve With Cartridge Secured By Projections, Ser. No. 761,594.

Top-Entry Check Valve With Cartridge Secured By Threaded Projections, Ser. No. 762,811.

Top-Entry Check Valve With Pin Fasteners, Ser. No. 762,539.

FIELD OF THE INVENTION

This invention relates to improvements in top-entry swing check valves.

SUMMARY OF THE INVENTION

The present invention provides a top-entry check valve with a smooth, straight chamber which minimizes both turbulence and pressure drop of the fluid passing through the valve. The relatively small cavity of this design allows an overall reduction in size and weight over conventional top-entry check valves.

The cartridge assembly of the valve includes a seat, a cage and a disc. The seat and cage are a unitary structure in order to make replacement of the seat and cage more easily accomplished through an access opening in the valve body.

A removable bonnet is attached over the access opening to the valve chamber. With the bonnet detached, the seat, cage and disc can readily be replaced.

An annular shoulder in the valve chamber prevents the valve cartridge from moving in an upstream direction. A spring retainer engages the valve body and valve cartridge to hold the valve cartridge against movement in a downstream direction.

Additional advantages and features of the present invention will become apparent from the detailed description of the preferred embodiments of the invention when read in conjunction with the drawings and appended claims.

BRIEF DESCRIPTION OF THE DRAWINGS

FIG. 1 is a vertical cross-sectional view of a prior art top-entry check valve with turbulent flow.

FIG. 2 is a vertical cross-sectional view of a top-entry check valve constructed in accordance with the present invention and illustrating the smooth flow through the valve chamber.

FIG. 3 is a side elevation of a top-entry check valve constructed in accordance with the present invention with a prior art top-entry check valve shown in partial outline to illustrate the improved dimensions of the present invention.

FIG. 6 is an elevational view of the unitary seat and cage of the valve of FIGS. 4 and 5 from the downstream side.

FIG. 7 is a side elevation of the unitary seat and cage of FIG. 6.

FIG. 8 is an elevational view of the unitary seat and cage of FIG. 6 from the upstream side.

FIG. 9 is an elevational view of the disc of the valve of FIGS. 4 and 5 from the downstream side.

FIG. 10 is a side elevation of the disc of FIG. 9.

FIG. 11 is an elevational view of the disc of FIG. 9 from the upstream side.

FIG. 14 is a vertical cross-sectional view of a portion of another form of top-entry check valve constructed in accordance with the present invention.

FIG. 15 is a cross-sectional view taken along lines 15—15 of FIG. 14.

FIG. 16 is an elevational view of the unitary seat and cage of the valve of FIGS. 14 and 15 from the downstream side.

FIG. 17 is a side elevation of the unitary seat and cage of FIG. 16.

FIG. 18 is an elevational view of the unitary seat and cage of FIG. 16 from the upstream side.

FIG. 21 is an elevational view of the unitary seat and cage of the valve of FIGS. 19 and 20 from the downstream side.

FIG. 22 is a side elevation of the unitary seat and cage of FIG. 21.

FIG. 23 is an elevational view of the unitary seat and cage of FIG. 21 from the upstream side.

DETAILED DESCRIPTION OF THE PREFERRED EMBODIMENTS

Figure 4:
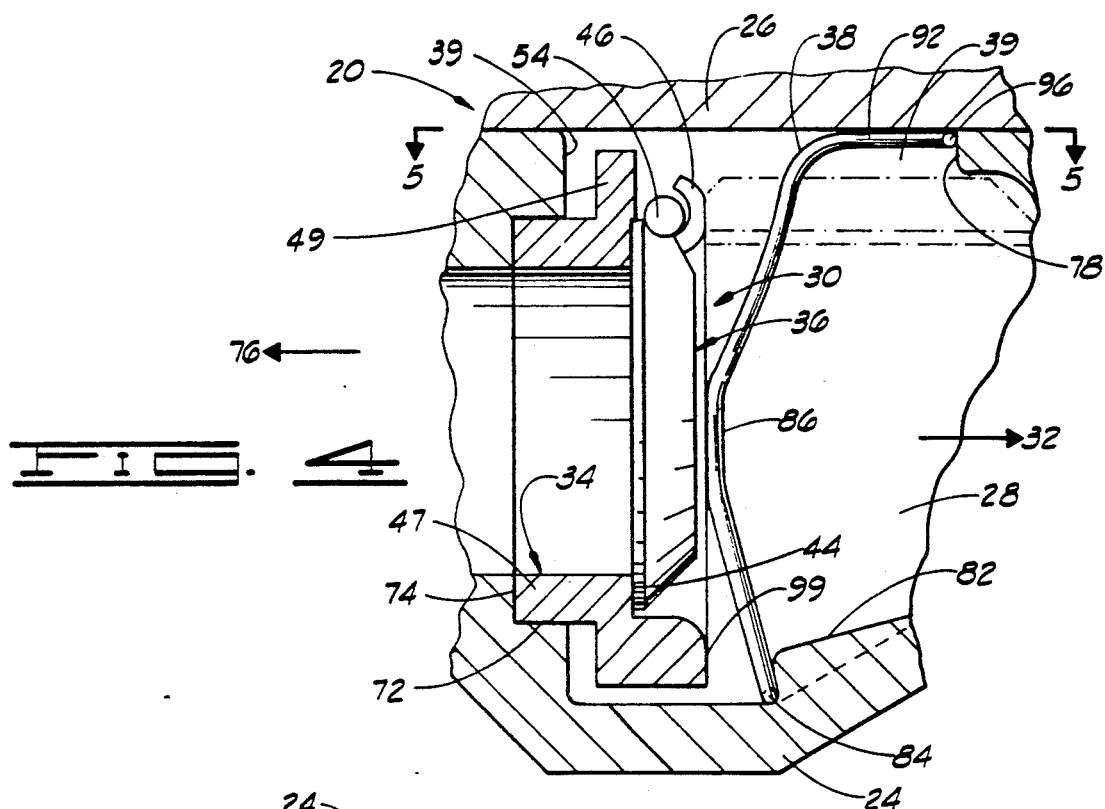
FIG. 4 is a vertical cross-sectional view of a portion of a top-entry check valve constructed in accordance with the present invention.

Referring now to the drawings in detail, and to FIG. 1 in particular, the reference numeral 10 generally designates a prior art top-entry check valve. Flow into the valve 10 is indicated by the straight arrows 11. As illustrated by the swirling arrows 12, turbulent flow is created by the high bonnet 14 and large cavity 16. This construction requires machining inside the valve body for the hinge 18 and valve seat 19.

FIG. 2 illustrates a typical top-entry check valve 20 constructed in accordance with the present invention. Flow into the valve 20 is designated by the straight arrows 21. The arrows 22 illustrate the smooth, even flow through valve 20. The improved flow is a result of the relatively straight lines of the valve body 24. The bonnet 26 forms the top wall of the valve chamber 28, such that there is virtually no cavity between the bonnet and the valve chamber, as contrasted with the existence of a cavity 16 in the prior art valve 10. The distance from the center-line 27 of the body 24 to the bottom of the bonnet 26 is approximately the same as the distance from the center-line to the bottom of the valve chamber.

FIG. 3 is a comparison of a conventional, prior art top-entry check valve 10 (partially in outline) and a check valve 20 constructed in accordance with the present invention (shown in full lines). This comparison illustrates the reduction in size and weight accomplished by the present invention. The drawing also shows the use of flanges 29 at the upstream and downstream ends of the valve 20, although it will be understood that the valve body 24 can be fitted with any desired connecting arrangement.

It will also be understood that the following embodiments include the use of standard seals, such as elastomeric O-ring seals, to provide fluid-tight engagement between various surfaces. Such seals are installed in a conventional manner where needed to prevent leakage of fluid between the valve components. These seals are omitted from the drawings in order to illustrate more clearly the preferred embodiments of the present invention.

Figure 5:
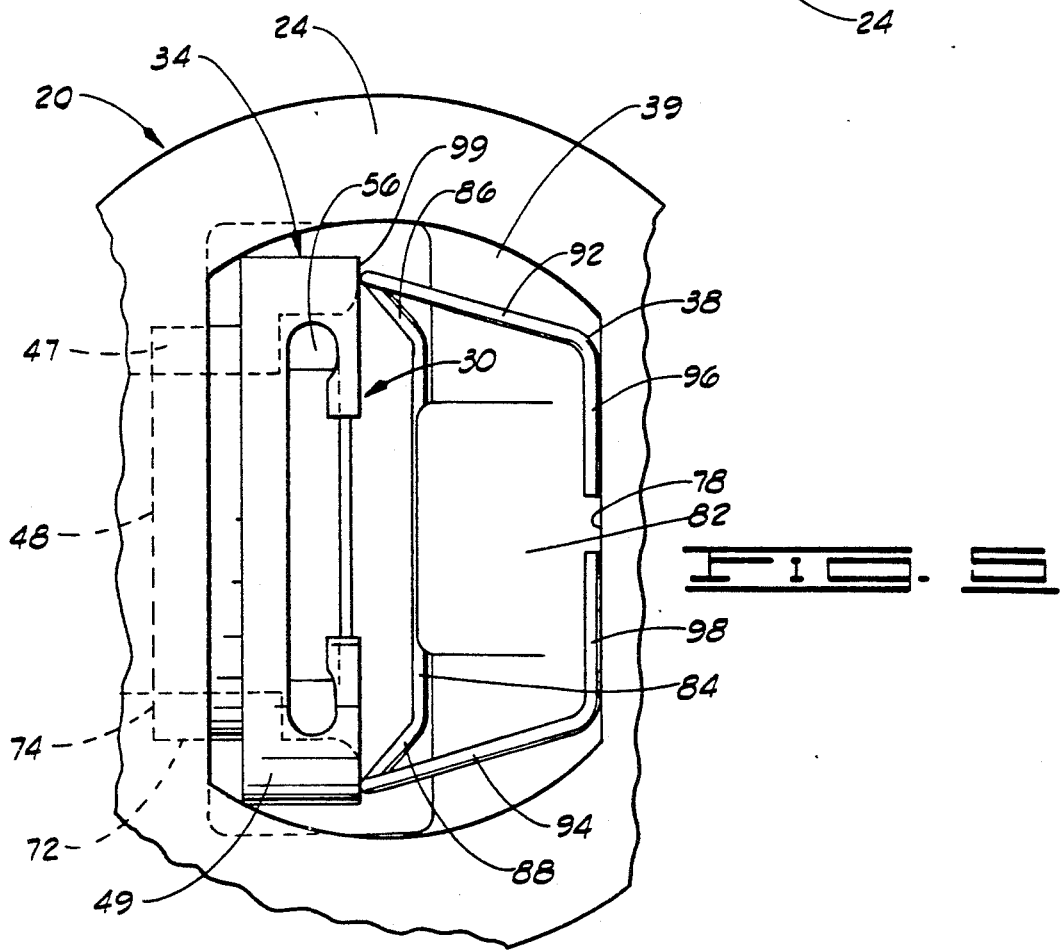
FIG. 5 is a cross-sectional view taken along lines 5—5 of FIG. 4.

Embodiment of FIGS. 4 and 5

In FIGS. 4 and 5, the central portion of a valve 20 constructed in accordance with the present invention is shown enlarged. As shown in these figures, the valve chamber 28 receives a valve cartridge assembly, generally designated by reference character 30. The valve cartridge assembly 30 controls the flow of fluid through the valve 20. The valve cartridge assembly 30 basically comprises a unitary valve seat and cage member 34, a valve disc 36 supported on the member 34 and a spring retainer 38. As best shown in FIG. 5, an access opening 39 allows installation and removal of the valve cartridge assembly 30, when the bonnet 26 is detached from the valve body 24.

The unitary seat and cage 34 of the valve 20 is shown separately in FIGS. 6, 7 and 8. The seat/cage 34 is generally circular with a flow opening 42 therethrough. An annular seating face 44 around the flow opening 42 is sized and shaped to mate with the disc 36. A pair of hinge pin supports 46 extend generally radially in the seat/cage 34 to suspend the disc 36 in the valve cartridge assembly 30. As best shown in FIG. 7, a reduced diameter extension 47 is formed on the upstream end 48 of the unitary seat and cage 34 and an annular shoulder 49 extends around the unitary seat and cage member 34. FIG. 7 also illustrates that the hinge pin supports 46 are generally U-shaped in cross-section.

The disc 36 of the valve 20 is shown separately in FIGS. 9, 10 and 11. The disc 36 is a generally circular flat plate 52. At least one hinge pin 54, with end portions 56, extends at a tangent from the plate 52. As discussed hereinafter, the end portions 56 of the hinge pin 54 pivotally support the disc 36 within the valve 20.

The arrangement of the valve cartridge assembly 30 in the valve chamber 28 is disclosed in FIGS. 4 and 5. As described hereinabove, the valve cartridge assembly 30 comprises a unitary seat and cage member 34, a valve disc 36 and a spring retainer 38. The upstream end portion 48 of the unitary seat and cage member 34 has a reduced diameter extension 47 which fits into a mating counterbore 72. The counterbore 72 forms an annular shoulder 74 facing downstream to mate with the upstream end 48 of the member 34. This arrangement prevents movement of the valve cartridge assembly 30 in the upstream direction indicated by arrow 76.

As best illustrated by FIG. 4, the hinge pin supports 46 of the unitary seat and cage member 34 cradle the end portions 56 of the hinge pin 54 of the disc 36 to suspend the disc 36 within the valve cartridge assembly 30. The hinge pin supports extend generally radially from the member 34 and one side is bent over the hinge pin to trap the hinge pin and prevent the hinge pin from coming out of the hinge pin supports. The disc 36 pivots about the axis of the hinge pin 54 to close against the seating face 44 of the unitary seat and cage member 34 and prevent flow through the valve cartridge assembly 30 in the upstream direction 76. Conversely, the disc 36 pivots about the axis of the hinge pin 54 to open away from the seating face 44 of the unitary seat and cage 34 and allow unobstructed flow through the valve cartridge assembly 30 in the downstream direction 32. The open position of the disc 36 is shown in outline in FIG. 4. The space provided in each hinge pin support is larger than the diameter of the hinge pin 54 to allow the disc 36 to "float" toward and away from the seating face 44 in a near closed position.

Continuing to refer to FIG. 4, the spring retainer 38 is installed at the downstream end of the unitary seat and cage member 34. The spring retainer 38 is secured in the valve chamber 28 by engagement with the bonnet 26, the upstream-facing surface 78 of the access opening 39, and a securing lug 82 extending into the valve chamber 28 from the valve body 24. The securing lug 82 protrudes into the valve chamber 28 and angles toward the upstream direction 76 to prevent the spring retainer 38 from movement in the downstream direction 32.

As best shown in FIG. 5, the spring retainer 38 is a unitary structure comprising a lower transverse member 84, two side members 86 and 88, two upper downstream members 92 and 94, and two upper transverse members 96 and 98. The lower transverse member 84 is held in place by the lug 82. The two side members 86 and 88 engage the valve cartridge assembly 30 to prevent downstream movement of the valve cartridge assembly 30. The two side members 86 and 88 extend generally upward and upstream to contact the valve cartridge assembly 30 and then generally upward and downstream. The two side members 86 and 88 contact the outside the downstream end 99 of the unitary seat and cage member 34 on opposite sides of the disc 36 in order to be clear of the pivoting movement of the disc 36. As best shown in FIG. 4, the two upper downstream members 92 and 94 of the spring retainer 38 engage the bonnet 26, while the upper transverse members 96 and 98 engage both the bonnet 26 and the upstream-facing surface 78 of the access opening 39 to secure the spring retainer 38 in the valve chamber 28.

The spring retainer 38 is sized and shaped to be under compression when installed in the valve chamber 28 as described hereinabove. The compression of the spring retainer 38 provides pressure to secure the reduced diameter extension 47 of the unitary seat and cage member 34 in the mating counterbore 72 of the valve chamber 28 and to prevent downstream movement of the valve cartridge assembly 30.

As FIG. 5 shows, with the bonnet 26 detached, the spring retainer 38 can be further compressed and the upper transverse members 96 and 98 can be dislodged from engagement with the upstream-facing surface 78 of the access opening 39. The spring retainer 38 can then be tilted and the lower transverse member 84 can be freed from the securing lug 82 in the valve body 24. The spring retainer 38 and then the valve cartridge assembly 30 can be removed from the valve chamber 28 through the access opening 39. Installation of the same or a replacement valve cartridge assembly 30 and spring retainer 38 is accomplished by a reversal of the removal steps.

Figure 12:
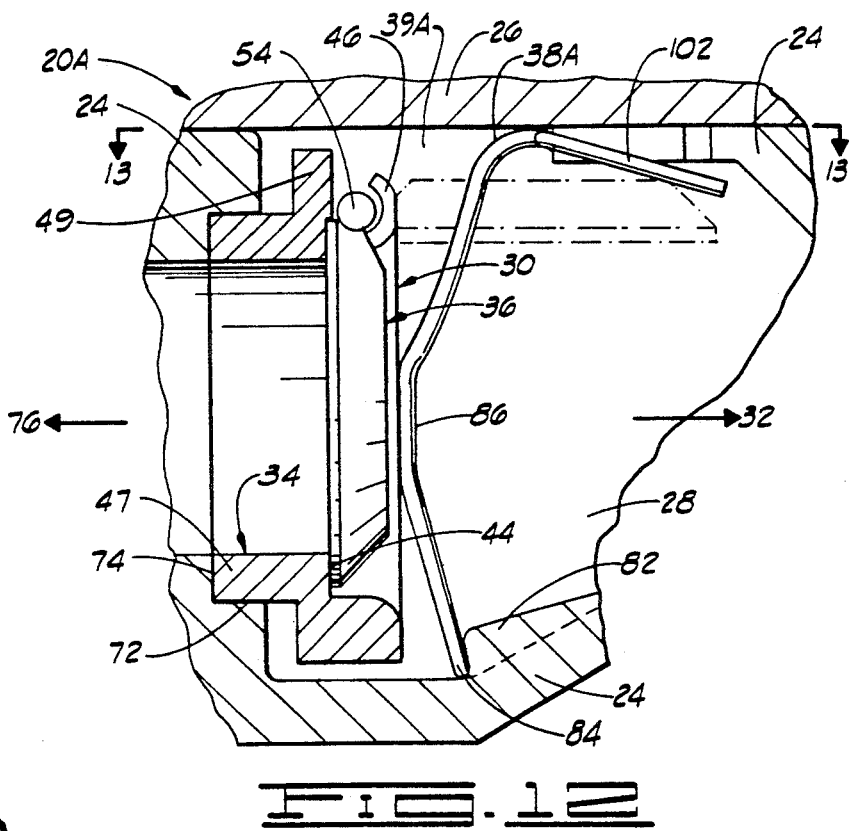
FIG. 12 is a vertical cross-sectional view of a portion of another form of top-entry check valve constructed in accordance with the present invention.
Figure 13:
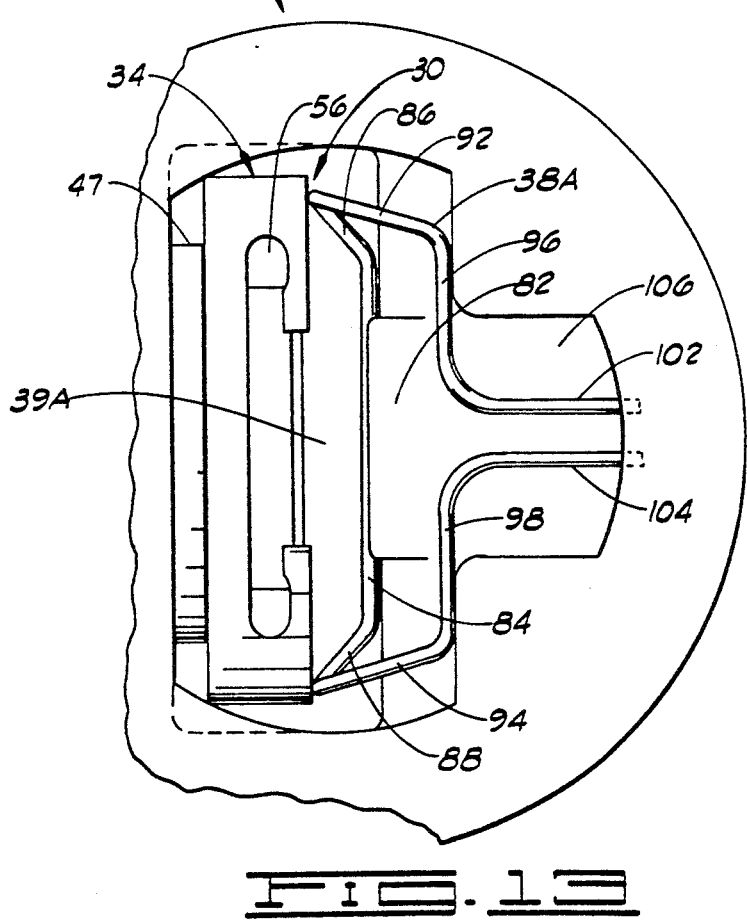
FIG. 13 is a cross-sectional view taken along lines 13—13 of FIG. 12.

Embodiment of FIGS. 12 and 13

Referring now to FIG. 12, reference character 20A designates another form of a valve constructed in accordance with the present invention. The spring retainer 38A is modified with respect to its downstream extension, and the access opening 39A is reshaped to accommodate the modified spring retainer 38A.

As best shown in FIG. 13, the spring retainer 38A has downstream extensions 102 and 104 extending from the upper transverse members 96 and 98 of the spring retainer 38A. The downstream extensions 102 and 104 are positioned to make contact with the disc 36 when the disc 36 pivots away from the seating face 44 of the unitary seat and cage member 34 to a fully open position. As illustrated by FIG. 12, the disc 36 in the open position (shown in outline) strikes the downstream extensions 102 and 104 of the spring retainer 38A before the disc 36 can reach the valve body 24. The downstream extensions 102 and 104 of the spring retainer 38A, therefore, are a buffer to prevent the disc 36 from striking the valve body 24 when the disc 36 swings open. In cushioning the impact on the disc 36 when the disc 36 opens, the downstream extensions 102 and 104 reduce wear on the disc 36 and prolong the useful life of the disc 36.

As best shown in FIG. 13, the access opening 39A has a downstream cutout 106 to accommodate the downstream extensions 102 and 104 of the spring retainer 38A. The cutout 106 in the access opening 39A is provided to allow removal and installation of the spring retainer 38A. It will be appreciated that the downstream extensions 102 and 104 extend downstream past the cutout 106 in the valve chamber 28 in order to cushion the disc 36 when the disc 36 swings open.

Embodiment of FIGS. 14 through 18

Referring now to FIG. 14, reference character 20B designates another form of a valve constructed in accordance with the present invention. In this particular embodiment, the valve body 24B and the seat and cage 34B are modified.

As shown in FIGS. 14 and 15, the seat and cage 34B has no reduced diameter extension and the valve body 24B has no mating counterbore to receive a reduced diameter extension. Instead the valve body has a downstream-facing surface 110 which engages the upstream end 48B of the seat and cage 34B. A positioning lug 112 is formed in the inside bottom of the valve body 24B and extends into the valve chamber 28. The positioning lug 112 supports the valve cartridge assembly 30B with the flow opening 42 aligned with the flow through the valve chamber 28. The spring retainer 38A secures the valve cartridge assembly 30B in place as described hereinabove.

The unitary seat and cage 34B is shown separately in FIGS. 16, 17 and 18. As illustrated by these figures, the seat and cage 34B is exactly like the seat and cage 34, except that seat and cage 34B has no reduced diameter extension at the upstream end 48.

Embodiment of FIGS. 19 through 23

Figure 19:
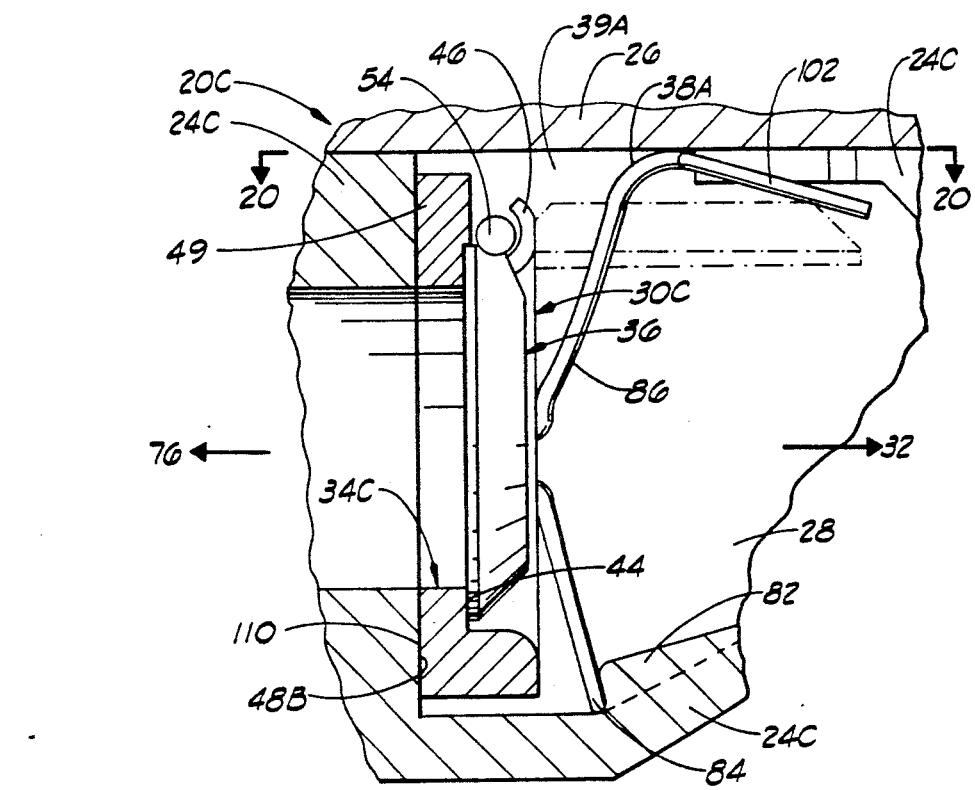
FIG. 19 is a vertical cross-sectional view of a portion of another form of top-entry check valve constructed in accordance with the present invention.

Referring now to FIG. 19, reference character 20C designates another form of a valve constructed in accordance with the present invention. In this particular embodiment, the valve body 24C, the seat and cage 34C and the spring retainer 38C are modified.

Figure 20:
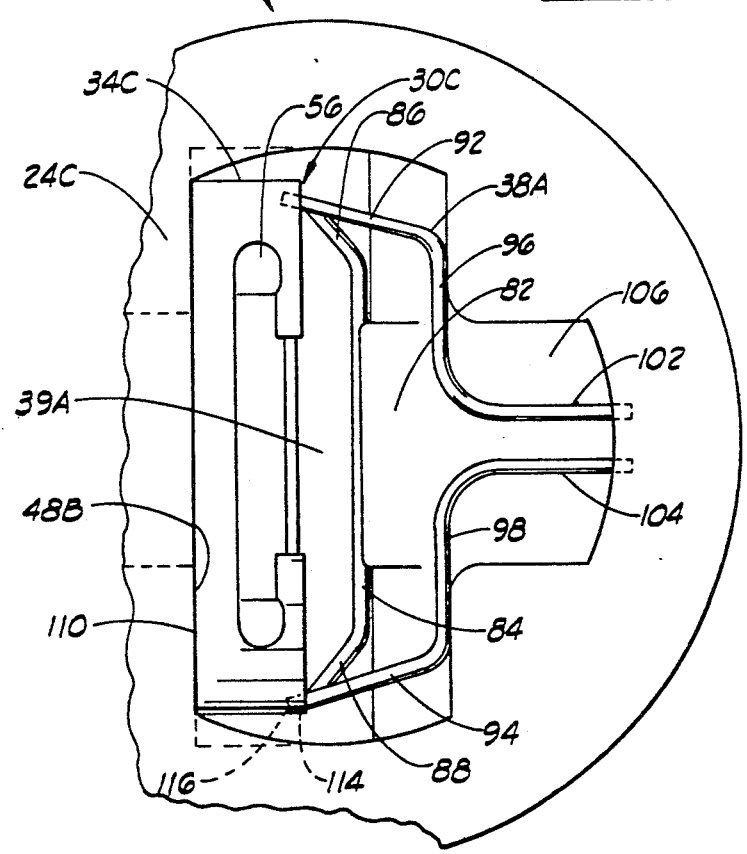
FIG. 20 is a cross-sectional view taken along lines 20—20 of FIG. 19.

As best shown in FIG. 19, the valve body 24C is exactly like the valve body 24B, except that the body 24C has no positioning lug 112. In order to position the valve cartridge assembly 30C properly, the spring retainer 38C has a protruding bend 114 in each side member 86 and 88. As illustrated by FIG. 20, each protruding bend 114 extends into a corresponding recess 116 formed in the downstream face of the seat and cage 34C. This arrangement of the bends 114 and recesses 116 maintains the valve cartridge assembly 30C in a position such that the flow opening 42 is aligned with the flow through the valve chamber 28 and the disc 36 prevents flow in the upstream direction 76 through the valve chamber 28.

The unitary seat and cage 34C is shown separately in FIGS. 21, 22 and 23. As best illustrated by FIG. 21, the unitary seat and cage 34C is a modification of the unitary seat and cage 34B. The only change is the addition of the recesses 116 to the downstream face of the unitary seat and cage 34C.

Changes may be made in the combinations, operations and arrangements of the various parts and elements described herein without departing from the spirit and scope of the invention as defined in the following claims.

What is claimed is:

1. A top entry check valve, comprising:
   a valve cartridge assembly, including a seat, cage and disc;
   a body having upstream and downstream ends, a valve chamber therein communicating with the upstream and downstream ends thereof, and an access opening in a side wall thereof communicating with the valve chamber of a size to accommodate the entry and removal of the valve cartridge assembly therethrough, said body also having an annular shoulder therein facing downstream sized to engage and prevent the valve cartridge from moving upstream;
   a bonnet removably attached to the body over said access opening; and
   a spring retainer in the valve chamber, accessible through the access opening, engaging the valve body, the bonnet and the cartridge assembly, holding the cartridge against downstream movement.

2. A top entry check valve, comprising:
   a valve cartridge assembly, including a seat, cage and disc;
   a body having upstream and downstream ends, a valve chamber therein communicating with the upstream and downstream ends, thereof, and an access opening in a side wall thereof communicating with the valve chamber of a size to accommodate the entry and removal of the valve cartridge assembly therethrough, said body also having an annular shoulder therein facing downstream sized to engage and prevent the valve cartridge from moving upstream;
   a bonnet removably attached to the body over said access opening; and
   a spring retainer in the valve chamber, accessible through the access opening, engaging the valve body and the cartridge assembly, holding the cartridge against downstream movement;
   wherein the disc is a generally circular flat plate having at least one hinge pin thereon extending along a tangent to the flat plate, and wherein the seat and cage of the cartridge assembly comprise a unitary structure forming an annular seating face sized to mate with the disc and a pair of hinge pin supports receiving the opposite end portions of the hinge pin.

3. A valve as defined in claim 2 wherein each hinge pin support is generally U-shaped in cross section.

4. A valve as defined in claim 2 wherein each hinge pin support is sized larger than the diameter of the hinge pin, whereby the disc can float in upstream and downstream directions in a near-closed position.

5. A valve as defined in claim 2 wherein at least a portion of the outer periphery of the unitary structure fits in a mating counterbore in the valve chamber.

6. A valve as defined in claim 2 wherein said hinge pin supports are generally U-shaped in cross-section and face radially with respect to the disc, and wherein one side of each hinge pin support is bent over a portion of the hinge pin to trap the hinge pin therein.

7. A top entry check valve, comprising:
a valve cartridge assembly, including a seat, cage and disc;
a body having upstream and downstream ends, a valve chamber therein communicating with the upstream and downstream ends thereof, and an access opening in a side wall thereof communicating with the valve chamber of a size to accommodate the entry and removal of the valve cartridge assembly therethrough, said body also having an annular shoulder therein facing downstream sized to engage and prevent the valve cartridge from moving upstream;
a bonnet removably attached to the body over said access opening; and
a spring retainer in the valve chamber, accessible through the access opening, the spring retainer having a lower transverse member bending into two side members extending upwardly from the lower transverse member, each side member bending into an upper downstream member, and each upper downstream member bending into an upper transverse member;
wherein the spring retainer engages the valve body and the cartridge assembly to hold the cartridge assembly against downstream movement.

8. A valve as defined in claim 7 wherein the access opening has an upstream-facing surface and wherein the upper transverse members of the spring retainer engage the upstream-facing surface of the access opening and the side members of the spring retainer engage the cartridge assembly to prevent the cartridge assembly from moving downstream.

9. A valve as defined in claim 7 wherein the body further comprises:
a lug projecting from the body into the valve chamber downstream from the lower transverse member of the spring retainer;
wherein the lower transverse member of the spring retainer engages the lug and the side members of the spring retainer engage the cartridge assembly to prevent the cartridge assembly from moving downstream.

10. A valve as defined in claim 7 wherein each upper transverse member of the spring retainer bends into a downstream extension positioned to make contact with the disc before the disc contacts the valve body when the disc pivots away from the seating face of the valve cartridge assembly.

11. A valve as defined in claim 10 wherein the access opening has a downstream cutout extending over a portion of the downstream extensions of the spring retainer.

12. A valve as defined in claim 7 wherein the valve body includes a positioning lug protruding into the valve chamber, the positioning lug supporting the valve cartridge assembly in an aligned position with the disc preventing flow through the valve chamber in the upstream direction.

13. A valve as defined in claim 7 wherein each side member of the spring retainer includes a bend in a medial portion thereof, each bend protruding in the upstream direction, and wherein a pair for recesses are formed in the downstream facing surface of the seat, each recess positioned and shaped to receive the protruding bend of one of the side members.

* * * * *